United States Patent
Xu et al.

(10) Patent No.: US 10,084,569 B2
(45) Date of Patent: Sep. 25, 2018

(54) DATA SENDING METHOD AND APPARATUS

(71) Applicant: ZTE CORPORATION, Shenzhen, Guangdong Province (CN)

(72) Inventors: Jun Xu, Shenzhen (CN); Liguang Li, Shenzhen (CN); Jin Xu, Shenzhen (CN); Kaibo Tian, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/320,757

(22) PCT Filed: Aug. 21, 2014

(86) PCT No.: PCT/CN2014/084950
§ 371 (c)(1),
(2) Date: Dec. 21, 2016

(87) PCT Pub. No.: WO2015/196551
PCT Pub. Date: Dec. 30, 2015

(65) Prior Publication Data
US 2017/0170925 A1    Jun. 15, 2017

(30) Foreign Application Priority Data
Jun. 23, 2014   (CN) .......................... 2014 1 0283660

(51) Int. Cl.
| H03M 13/00 | (2006.01) |
| H04L 1/00 | (2006.01) |
| H04L 1/18 | (2006.01) |

(52) U.S. Cl.
CPC .......... *H04L 1/0041* (2013.01); *H04L 1/0058* (2013.01); *H04L 1/0061* (2013.01); *H04L 1/1812* (2013.01)

(58) Field of Classification Search
CPC ... H04L 1/0041; H04L 1/0058; H04L 1/0061; H04L 1/1812
See application file for complete search history.

(56) References Cited

U.S. PATENT DOCUMENTS

2006/0072538 A1* 4/2006 Raith .................... H04L 1/0041
370/349
2013/0117638 A1    5/2013 Yang et al.

FOREIGN PATENT DOCUMENTS

| CN | 101359981 A | 2/2009 |
| CN | 102484484 A | 5/2012 |

(Continued)

*Primary Examiner* — Sam Rizk
(74) *Attorney, Agent, or Firm* — Ling Wu; Stephen Yang; Ling and Yang Intellectual Property

(57) ABSTRACT

The method includes code block segmentation is performed on a physical layer source data packet, to be sent, having a length of $K_s$ bits, and channel coding is performed on each code block obtained by segmentation, to obtain $C_s$ error-corrected and coded source data sub-packets having lengths of $K_c$ bits; packet coding is performed on the error-corrected and coded source data sub-packets, to obtain $C_p$ check data sub-packets; $K_i$ codeword bits are selected from the $i^{th}$ sub-packet in $C_s$ source data sub-packets, $K_j$ codeword bits are selected from the $j^{th}$ sub-packet in the $C_p$ check data sub-packets, all the selected bits are cascaded together to form a sequence having a length of formula (I), i=0, 1, ..., $C_s-1$, j=0, 1, ..., $C_p-1$, and the sequence is sent, herein $K_s$, $C_s$ and $K_c$ are integers greater than 1, and $C_p$, $K_i$ and $K_j$ are integers greater than or equal to 0.

20 Claims, 3 Drawing Sheets

(56) References Cited

FOREIGN PATENT DOCUMENTS

WO         2009118613 A2    10/2009
WO    WO2013081414 A1    6/2013

\* cited by examiner

DATA SENDING METHOD AND APPARATUS

TECHNICAL FIELD

The present disclosure relates to the field of communications, and more particularly to a data sending method and apparatus.

BACKGROUND

The objective of channel coding is to fight against various noises and interferences in a transmission process. Usually, the system can be endowed with an ability to automatically correct an error by manually adding redundant information, thereby ensuring the reliability of digital transmission. A Turbo code is one of the optimal Forward Error Correction (FEC) codes accepted at present, and is widely adopted in many standard protocols as a channel coding solution for data service transmission. Moreover, with the increase of decoding iterations, the decoding error-correcting performance will be continuously perfected. The Turbo codes commonly used at present include binary Turbo codes and dual-binary tail-biting Turbo codes.

Rate matching processing is a very key technology after channel coding. The objective thereof is to repeat or puncture, under the control of an algorithm, codeword bits subjected to channel coding, so as to ensure that data bit lengths after rate matching are matched with allocated physical channel resources. At present, there are mainly two rate matching algorithms: a $3^{rd}$ Generation Partnership Project (3GPP) R6 rate matching algorithm and a Circular Buffer Rate Matching (CBRM) algorithm. Herein, the CBRM algorithm is a simple algorithm capable of generating an excellent pattern puncturing performance, and this rate matching algorithm is adopted in a majority of communication systems such as 3GPP2 series standards, IEEE802.16e standards and 3GPP Long-Term Evolution (LTE).

In the CBRM algorithm, under the condition that the code rate is ⅓, codeword bits output by Turbo coding will be separated into three data bit streams through separation of bits: a system bit stream, a first check bit stream and a second check bit stream. The above-mentioned data bit streams are re-arranged respectively by using a block interleaver, this processing process usually being called as intra-block interleaving. Then, in an output buffer, re-arranged system bits are put at a starting position, and thereafter, two re-arranged check bit streams are placed in a staggered manner, called as inter-block interleaving.

Moreover, in this processing process, Ndata coding bits may be selected as output of CBRM according to a desired output code rate. CBRM reads out Ndata coding bits from a certain specified starting position from the output buffer, called as bit selection. In general, the selected bits for transmission may be read out from any position in the buffer. After the last bit of a circular buffer area is read, the next bit data is the first bit position data of the circular buffer area. So, the rate matching based on circular buffer (puncture or repetition) may be implemented by using a simple method. Circular buffer also has the advantages of flexibility and granularity as for a Hybrid Automatic Repeat Request (HARQ) operation to be described below.

An HARQ is an important link adaptation technology in a digital communication system. This technology functionally refers to that: a receiving end decodes an HARQ data packet received thereby, feeds an ACK signal back to a sending end if decoding corrects, and informs the sending end to send a new HARQ data packet; and the receiving end feeds an NACK signal back to the sending end if decoding fails, and requests the sending end to re-send an HARQ data packet. The receiving end performs Incremental Redundancy (IR) or Chase combined decoding on data packets repeated for many times, so the decoding success probability may be improved, and the requirement of high reliability on link transmission is met.

Under an HARQ mode, different positions may be specified in a circular buffer to serve as read starting positions of an HARQ data packet transmitted at each time. A definition of a Redundancy Version (RV) determines a plurality of read starting positions of the HARQ data packet in the circular buffer, and the value of the RV will determine specific read starting positions of the HARQ data packet transmitted at this time in the circular buffer.

For example, in LTE, the RV defines a starting point of the circular buffer for selecting a segment of codewords to generate a current HARQ packet. If there are four RVs, four positions are evenly marked in the circular buffer from left to right in correspondence to the RVs 0, 1, 2 and 3. More specific descriptions may refer to proposals and standards for virtual CBRM of LTE, which will not be elaborated herein.

During data transmission on a network or a communication channel, data is divided into data packets for transmission. In order to improve the reliability of data transmission, an error-correcting mechanism usually needs to be provided by using a network protocol or coding. For example, during the data transmission on the internet, it is necessary to reliably transmit the data by using an error check retransmission mechanism provided by a Transmission Control Protocol (TCP). That is, when loss of data packets is detected, a sender is informed of resending. In a communication system, a Media Access Control (MAC) layer supports an ARQ mechanism, and if the data packets are wrongly transmitted, this mechanism also ensures reliable transmission by repeatedly sending the data packets.

During data transmission in a multimedia broadcast channel, because a one-way channel is used and data is sent by using a one-to-many broadcast/multicast mode, the receiving end is not allowed to feed back data packet loss and error information to the sending end, and the above-mentioned error check retransmission mechanism cannot be used. Under this condition, the data packet needs to perform Forward Error Correction (FEC) coding before sending, and in this case, a raptor code is mainly used.

The inventor of the present disclosure discovers that a prior communication system has the following problems.

As for a future HARQ-supporting communication system (e.g., a fifth mobile communication system), main scenarios and demands of 5G include Device-to-Device (D2D) communication, internet-of-things communication (MCP), Ultra-Dense Network (UDN) communication, Mobile Network (MN) communication, and ultra-reliable (UN) communication. In order to meet new 5G demands, a future 5G link enhancement technology needs to satisfy low-delay and high-throughput characteristics, so how to reduce a repeat count or repeat delay of an HARQ for a future communication system supporting the HARQ is a problem to be solved.

As for a future communication system not supporting the HARQ (e.g., future Wireless Local Area Network (WLAN) system), a target Block Error Ratio (BLER) of a physical layer data packet cannot be too low and is required to be $10^{-1}$, at least. If a data packet needs to be decomposed into a great number of coded blocks, the error rate of each coded block (BCER) is often high in requirement, and when the number N of code blocks is large (e.g., N is greater than or equal to 10), if the target BLER of the physical layer data packet is less than 0.5, the BLER is about equal to N*BCER. Hence, in order to achieve the target BLER, a low coded block target BCER is needed, and the system needs to give a great signal to noise ratio. Particularly, the system efficiency will be obviously limited under poorer channel conditions. So, how to reduce the target BCER of each coded block for the future communication system not supporting the HARQ is a problem to be solved.

An existing broadcast and multicast communication system (e.g., a DVB system and a 3GPP Multimedia Broadcast Multicast System (MBMS)) introduces a Raptor code or a Fountain code, and this erasure code is mainly applied to a long code instead of an optimal code, and as long as the code length is greatest, the code has the performance approaching the performance of the optimal code. Under the condition that the number of data packets is small (e.g., less than 200), how to design an effective performance-optimal and complexity-minimum coding solution is a problem to be solved.

In addition, packaging coding may be considered to be used during multi-path (including multi-cell and multi-RAT) flexible transmission of borne data. Under the condition that the number of data packets is small (e.g., less than 100), how to design an effective performance-optimal and complexity-minimum coding solution is a problem to be solved.

In conclusion, a communication system in the related art lacks a coding solution for a physical layer big data block (Transmission Block (TB)) which may be segmented into a great number of coded blocks.

SUMMARY

The embodiment of the present disclosure provides a data sending method and apparatus, which are intended to at least solve the problem in the related art that a communication system lacks a coding solution for a physical layer big data block (TB) which may be segmented into a great number of coded blocks.

According to an embodiment of the present disclosure, a data sending method is provided, which includes that: code block segmentation is performed on a physical layer source data packet, to be sent, having a length of $K_s$ bits, and channel coding is performed on various code blocks obtained by segmentation, to obtain $C_s$ error-corrected and coded source data sub-packets having lengths of $K_c$ bits; packet coding is performed on the error-corrected and coded source data sub-packets, to obtain $C_p$ check data sub-packets; and $K_i$ codeword bits are selected from the $i^{th}$ sub-packet in the $C_s$ source data sub-packets, $K_j$ codeword bits are selected from the $j^{th}$ sub-packet in the $C_p$ check data sub-packets, all the selected bits are cascaded together to form a sequence having a length of $$G = \sum_{i=0}^{C_s-1} K_i + \sum_{j=0}^{C_p-1} K_j,$$

$i=0, 1, \ldots, C_s-1, j=0, 1, \ldots, C_p-1$, and the sequence is sent, herein $K_s$, $C_s$ and $K_c$ are integers greater than 1, and $C_p$, $K_i$ and $K_j$ are integers greater than or equal to 0.

In an exemplary embodiment, the step that packet coding is performed on the error-corrected and coded source data sub-packets to obtain the check data sub-packets includes that: under the condition that the number $C_s$ of code blocks is greater than a preset threshold $C_0$ and/or a code rate $R_s$ of the physical layer source data packet is less than a preset code rate $R_0$, packet coding is performed on the $C_s$ source data sub-packets, to obtain $C_p$ $K_c$ bit check data sub-packets, herein $C_0$ and $R_0$ are positive integers; and under the condition that the number $C_s$ of code blocks is less than or equal to the preset threshold $C_0$ and/or the code rate $R_s$ of the physical source data packet is greater than or equal to the preset code rate $R_0$, packet coding is not performed on the $C_s$ source data sub-packets or packet coding is performed only on first $K_d$ bits of the $C_s$ source data sub-packets, herein $K_d$ is a positive integer less than or equal to $K_c$; herein the code rate $R_s$ of the physical layer source data packet refers to a length $K_s$ of the physical layer source data packet or a ratio of $K_s-X_{scrc}$ to a length G of a total codeword bit of, after a whole coding transmission is completed, source data, and $X_{scrc}$ is a length of a Cyclic Redundancy Check code (CRC) of the physical layer source data packet.

In an exemplary embodiment, $K_d$ is a preset value, or determined according to the number $C_s$ of code blocks and/or the code rate $R_s$ of the physical layer source data packet.

In an exemplary embodiment, the step that packet coding is performed on the $C_s$ source data sub-packets to obtain the $C_p$ $K_c$ bit check data sub-packets includes that: $i^{th}$ bits of all the source data sub-packets form an $i^{th}$ information sequence $S_i$ having a length of $C_s$ bits in sequence, and check coding is performed on the information sequence $S_i$, to obtain an $i^{th}$ check sequence $P_i$ with D bits, a $j^{th}$ bit of the check sequence $P_i$ forming an $i^{th}$ bit of the $j^{th}$ check data sub-packet, herein $i=0, 1, 2, \ldots, K_c-1, j=0, \ldots, C_p-1$, and D is an integer greater than or equal to 1.

In an exemplary embodiment, the check coding includes one of: Single Parity Check (SPC) coding, D-fold single bit parity check code, and D-fold single bit parity check code having different coefficients of a multi-element field GF(q).

In an exemplary embodiment, the step that D-fold single bit parity check code is performed on the information sequence $S_i$ includes that: binary exclusive OR addition is performed on all input $C_s$ information bits, to obtain a first check bit, and binary exclusive OR addition is performed on a subset $Set_l$ of the $C_s$ information bits, to obtain an $(l+2)^{th}$ check bit, herein every two subsets, in various subsets of the $C_s$ information bits, do not have identical elements, and the number of elements in any one subset is less than or equal to ceil(D/2), herein $l=0, \ldots, D-2$.

In an exemplary embodiment, the step that D-fold single bit parity check code is performed on the information sequence $S_i$ includes that: binary exclusive OR addition is performed on all input $C_s$ information bits, to obtain a first check bit; and $l^{th}$ interweaving is performed on the $C_s$ information bits, and binary exclusive OR addition is performed on first floor($C_s/2$) or ceil($C_s/2$) bits, to obtain an $(l+2)^{th}$ check bit, herein every two interweaving modes of interweaving at each time are totally different, herein $l=0, \ldots, D-2$.

In an exemplary embodiment, $C_0$ is an integer greater than 2, and $R_0$ is a real number ranging from 0 to 1.

In an exemplary embodiment, the step that the sequence is sent includes that: the size of $K_i$ and the size of $K_j$ are determined according to one or more of the following parameters: a codeword length $K_c$ of error-correcting coding, a number of times of transmission of an HARQ process, an RV of an HARQ process, and a length G of a total codeword bit of source data after the whole coding transmission is completed, $i=0, 1, \ldots, C_s-1, j=0, 1, \ldots, C_p-1$;

and/or, bit data from the source data sub-packets in the sequence is sent according to a mode of M1 modulation order, and bit data from the check data sub-packets in the sequence is sent according to a mode of M2 modulation order, herein M2 is greater than or equal to M1, and M1 and M2 are integers greater than or equal to 2.

In an exemplary embodiment, before code block segmentation is performed, the physical layer source data packet includes a CRC having a length of $X_{scrc}$ bits.

In an exemplary embodiment, during code block segmentation, code block segmentation is performed on $K_s$ bit physical layer source data to obtain $C_s$ source data sub-packets, and a code block CRC having an equal length of $X_{crc}$ bits is added to each source data sub-packet, herein $X_{crc}$ is a CRC bit number of each source data sub-packet.

In an exemplary embodiment, if $K_s < C_s*(K_x - X_{crc})$, before code block segmentation is performed on the physical layer source data packet, to be sent, having the length of $K_s$ bits, the physical layer source data packet is filled with $C_s*(K_x - X_{crc}) - K_s$ predetermined filling bits, herein $K_x$ is a length of each code block after a code block CRC is added.

In an exemplary embodiment, the step that channel coding is performed on each code block obtained by segmentation includes that: channel coding having the same code rate and the same coding mode is performed on each the code block to obtain codeword data sub-packets having the same length of $K_c$ bits, herein the channel coding mode includes one of: error control coding Reed Muller, convolutional code, turbo code, and Low Density Parity Check (LDPC) coding.

According to a further embodiment of the present disclosure, a data sending apparatus is provided, which includes: a segmentation module, arranged to perform code block segmentation on a physical layer source data packet, to be sent, having a length of $K_s$ bits; a channel coding module, arranged to perform channel coding on various code blocks obtained by segmentation, to obtain $C_s$ error-corrected and coded source data sub-packets having lengths of $K_c$ bits, herein $K_s$, $C_s$ and $K_c$ are integers greater than 1; a packet coding module, arranged to perform packet coding on the error-corrected and coded source data sub-packets, to obtain $C_p$ check data sub-packets; and a sending module, arranged to select $K_i$ codeword bits from the $i^{th}$ sub-packet in the $C_s$ source data sub-packets, select $K_j$ codeword bits from the $j^{th}$ sub-packet in the $C_p$ check data sub-packets, cascade all the selected bits together to form a sequence having a length of $$G = \sum_{i=0}^{C_s-1} K_i + \sum_{i=0}^{C_p-1} K_j,$$

$i=0, 1, \ldots, C_s-1, j=0, 1, \ldots, C_p-1$, and send the sequence, herein $C_p$, $K_i$ and $K_j$ are integers greater than or equal to 0.

In an exemplary embodiment, the packet coding module includes: a first packet coding sub-unit, arranged to perform, under the condition that the number $C_s$ of code blocks is greater than a preset threshold $C_0$ and/or a code rate $R_s$ of the physical layer source data packet is less than a preset code rate $R_0$, packet coding on the $K_c$ source data sub-packets, to obtain $C_p K_c$ bit check data sub-packets, herein $C_0$ and $R_0$ are positive integers; and a second packet coding unit, arranged to not perform, under the condition that the number $C_s$ of code blocks is less than or equal to the preset threshold $C_0$ and/or the code rate $R_s$ of the physical layer source data packet is greater than or equal to the preset code rate $R_0$, packet coding on the $C_s$ source data sub-packets, or arranged to perform packet coding only on first $K_d$ bits of the $C_s$ source data sub-packets, herein $K_d$ is a positive integer less than or equal to $K_c$, and $K_d$ is a preset value or determined according to the number $C_s$ of code blocks, herein the code rate $R_s$ of the physical layer source data packet refers to a length $K_s$ of the physical layer source data packet or a ratio of $K_s - X_{scrc}$ to a length G of a total codeword bit of source data after the whole coding transmission is completed, and $X_{scrc}$ is a length of a CRC of the physical layer source data packet.

In an exemplary embodiment, the first packet coding unit performs packet coding on the $C_s$ source data sub-packets by means of the following modes: forming an $i^{th}$ information sequence $S_i$ having a length of $C_s$ bits by $i^{th}$ bits of all the source data sub-packets in sequence, and performing check coding on the information sequence $S_i$, to obtain an $i^{th}$ check sequence $P_i$ with D bits, a $j^{th}$ bit of the check sequence $P_i$ forming an $i^{th}$ bit of the $j^{th}$ check data sub-packet, herein $i=0, 1, 2, \ldots, K_c-1, j=0, \ldots, C_p-1$, and D is an integer greater than or equal to 1.

In an exemplary embodiment, the first packet coding unit performs check coding on the information sequence $S_i$ by using one of the following coding modes: SPC coding, D-fold single bit parity check code, and D-fold single bit parity check code having different coefficients of a multi-element field GF(q).

In an exemplary embodiment, the first packet coding unit performs D-fold single bit parity check coding on the information sequence $S_i$ according to the following modes: performing binary exclusive OR addition on all input $C_s$ information bits, to obtain a first check bit, and performing binary exclusive OR addition on a subset $Set_l$ of the $C_s$ information bits, to obtain an $(l+2)^{th}$ check bit, herein every two subsets, in various subsets of the $C_s$ information bits, do not have identical elements, and the number of elements in any one subset is less than or equal to ceil(D/2); or, performing binary exclusive OR addition on all input $C_s$ information bits, to obtain a first check bit, performing $l^{th}$ interweaving on the $C_s$ information bits, and performing binary exclusive OR addition on first floor($C_s$/2) or ceil($C_s$/2) bits, to obtain an $(l+2)^{th}$ check bit, herein every two interweaving modes of interweaving at each time are totally different, herein $l=0, \ldots, D-2$.

In an exemplary embodiment, the sending module sends the sequence according to the following modes: determining the size of $K_i$ and the size of $K_j$ according to one or more of the following parameters: a codeword length $K_c$ of error-correcting coding, a number of times of transmission of an HARQ process, an RV of an HARQ process, and a length G of a total codeword bit of source data after the whole coding transmission is completed, $i=0, 1, \ldots, C_s-1, j=0, 1, \ldots, C_p-1$; and/or, sending bit data from the source data sub-packets in the sequence according to a mode of M1 modulation order, and sending bit data from the check data sub-packets in the sequence according to a mode of M2 modulation order, herein M2 is greater than or equal to M1, and M1 and M2 are integers greater than or equal to 2.

In an exemplary embodiment, the segmentation module is further arranged to perform code block segmentation on $K_s$ bit physical layer source data to obtain $C_s$ source data sub-packets, and then add a code block CRC having an equal length of $X_{crc}$ bits to each source data sub-packet, herein $X_{crc}$ is a CRC bit number of each source data sub-packet.

According to yet a further embodiment of the present disclosure, a data sending end is provided, which includes the above-mentioned data sending apparatus.

By means of the embodiment of the present disclosure, code block segmentation and channel coding are performed on a physical layer source data packet, and then packaging coding is performed to obtain check data sub-packets. A physical layer big data block (TB) which may be segmented into a great number of coded blocks is coded, thereby improving the transmission performance of the big data block.

BRIEF DESCRIPTION OF DRAWINGS

The accompanying drawings described herein are used to provide further understanding of the present disclosure, and form a part of the present application. The schematic embodiments and descriptions thereof of the present disclosure are used to explain the present disclosure, and do not form improper limits to the present disclosure. In the accompanying drawings.

SPECIFIC EMBODIMENTS OF THE PRESENT DISCLOSURE

The present disclosure will be elaborated below with reference to the accompanying drawings and in conjunction with the embodiments. It is important to note that the embodiments in the present application and the characteristics in the embodiments may be combined without conflicts.

According to an embodiment of the present disclosure, a data sending method is provided.

Figure 1:
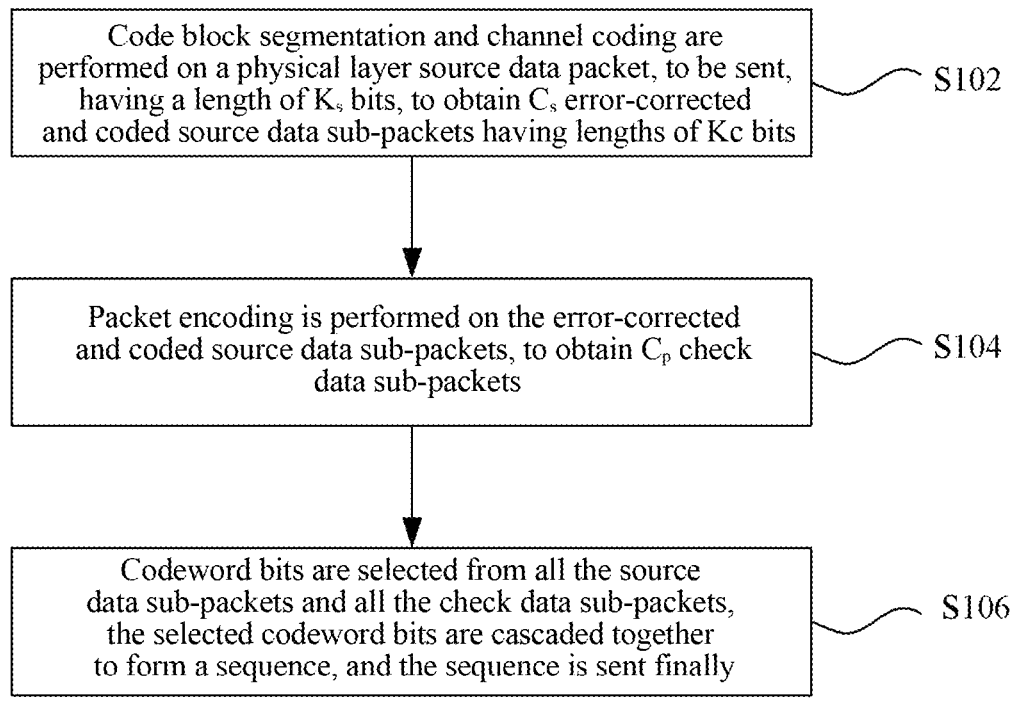
FIG. 1 is a flowchart of a data sending method according to an embodiment of the present disclosure.

FIG. 1 is a flowchart of a data sending method according to an embodiment of the present disclosure. As shown in FIG. 1, the method mainly includes Step S102 to Step S106.

In Step S102: Code block segmentation and channel coding are performed on a physical layer source data packet, to be sent, having a length of $K_s$ bits, to obtain $C_s$ error-corrected and coded source data sub-packets having lengths of $K_c$ bits.

In an alternative implementation mode of the embodiment of the present disclosure, in Step S102, before code block segmentation is executed, the physical layer source data packet includes a CRC having a length of $X_{crc}$ bits.

In an alternative implementation mode of the embodiment of the present disclosure, in Step S102, during code block segmentation, code block segmentation is performed on $K_s$ bit physical layer source data to obtain $C_s$ code blocks, and then a code block CRC having an equal length $X_{crc}$ is added to each code block.

In an alternative implementation mode of the embodiment of the present disclosure, if $K_s < C_s*(K_x-X_{crc})$, before code block segmentation is performed on a physical layer source data packet, to be sent, having the length of $K_s$ bits, the physical layer source data packet is filled with $C_s*(K_x-X_{crc})-K_s$ predetermined filling bits, herein $K_x$ is a length of each code block after a code block CRC is added.

More specifically, as for a fourth mobile communication system, i.e. a LTE system, the physical layer source data packet refers to a TB including a Transmission Block CRC; as for a system such as 11ac and 11aj of a Wireless Local Area Network WLAN, the physical layer source data packet refers to a Physical layer Service Data Unit (PSDU) data packet; and as for a Worldwide Interoperability for Microwave Access (WIMAX) system, the physical layer source data packet refers to burst.

In an alternative implementation mode of the embodiment of the present disclosure, in Step S102, during channel coding on each segmented code block, channel coding having the same code rate and the same coding mode is performed on each code block to obtain codeword data sub-packets having the same length of $K_c$ bits, herein channel coding is one of: Reed Muller coding, convolutional code, turbo code, and LDPC coding.

Figure 2:
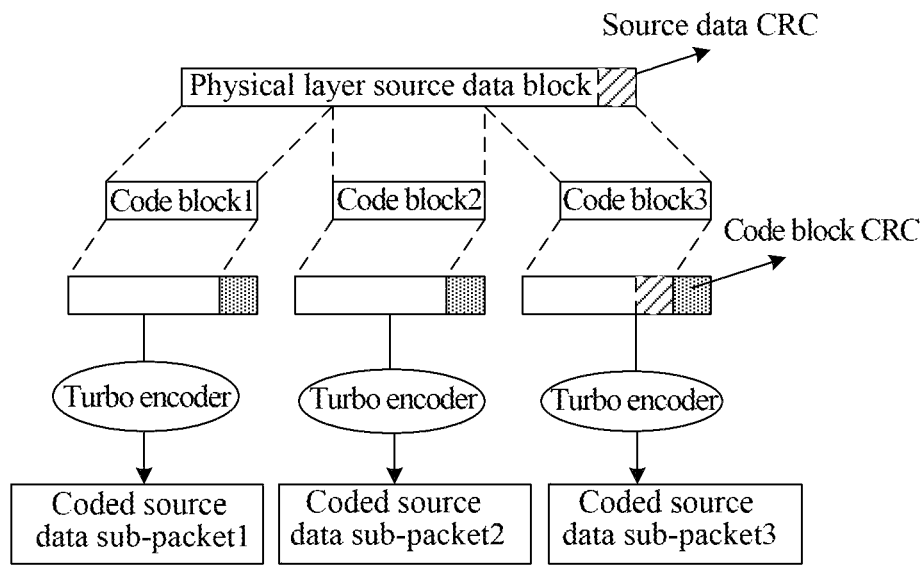
FIG. 2 is a flow diagram showing acquisition of an error-corrected and coded source data sub-packet in an embodiment of the present disclosure.

FIG. 2 shows a flow diagram of an embodiment for a processing process from a physical layer source data packet to an error-corrected source data sub-packet. As shown in FIG. 2, the physical layer source data packet is segmented into a plurality of code blocks firstly, a CRC is added into each code block, and then coding is performed by using a turbo coder, so as to obtain a plurality of error-corrected source data sub-packets.

In Step S104: Packet coding is performed on the error-corrected and coded source data sub-packets, to obtain $C_p$ check data sub-packets.

In an alternative implementation mode of the embodiment of the present disclosure, if the number $C_s$ of code blocks is greater than a fixed threshold $C_0$ and/or a code rate $R_s$ of the physical layer source data packet is less than a fixed code rate $R_0$, packet coding is performed on the $C_s$ source data sub-packets, to obtain $C_p$ $K_c$ bit check data sub-packets, herein the code rate $R_s$ of the physical layer source data packet refers to a length $K_s$ of the physical layer source data packet or a ratio of a length $K_s-X_{scrc}$ of a source data packet excluding a source data CRC to a length G of a codeword of source data after the whole coding transmission is completed, and $X_{scrc}$ is a length of a source data packet CRC.

If the source data packet does not have the source data packet CRC, $R_s=K_s/G$.

If the source data packet has the source data packet CRC, $R_s=(K_s-X_{scrc})/G$.

In an alternative implementation mode of the embodiment of the present disclosure, the step that packet coding is performed on the $C_s$ source data sub-packets may include that: $i^{th}$ bits of all first data sub-packet form an $i^{th}$ information sequence $S_i$ having a length of $C_s$ bits in sequence, and check coding is performed on the $i^{th}$ information sequence, to obtain an $i^{th}$ check sequence $P_i$ with D bits, a $j^{th}$ bit of the check sequence $P_i$ forming an $i^{th}$ bit of the $j^{th}$ check sub-packet, herein i=0, 1, 2, . . . , $K_c$-1, j=0, . . . , $C_p$-1. The check coding is at least one of the following coding: SPC coding, D-fold single bit parity check code, and D-fold single bit parity check code having different coefficients of a multi-element field GF(q).

In an alternative implementation mode of the embodiment of the present disclosure, $C_0$ may be an integer greater than 2, and $R_0$ may be a real number ranging from 0 to 1.

Herein, if the D-fold single bit parity check code is adopted, check coding may be implemented according to the following two modes.

Implementation mode 1: Binary exclusive OR addition is performed on all input $C_s$ information bits, to obtain a first check bit, and binary exclusive OR addition is performed on a subset $Set_l$ of the $C_s$ information bits, to obtain an $(l+2)^{th}$ check bit, herein every two subsets, in various subsets of the $C_s$ information bits, do not have identical elements, and the number of elements in any one subset is less than or equal to ceil(D/2), herein l=0, . . . , D−2.

Implementation mode 2: Binary exclusive OR addition is performed on all input $C_s$ information bits, to obtain a first check bit; and $l^{th}$ interweaving is performed on the $C_s$ information bits, and binary exclusive OR addition is performed on first floor($C_s$/2) or ceil($C_s$/2) bits, to obtain an $(l+2)^{th}$ check bit, herein every two interweaving modes of interweaving at each time are totally different, herein l=0, . . . , D−2.

In an alternative implementation mode of the embodiment of the present disclosure, if the number $C_s$ of code blocks is less than the fixed threshold $C_0$, and/or the code rate $R_s$ of the physical layer source data packet is greater than the fixed code rate $R_0$, processing is performed according to one of the following modes:

Mode 1: Packet coding is not performed on the $C_s$ data packets.

Mode 2: Packet coding is performed only on $K_d$ bits in the $C_s$ data packets, herein $K_d$ is a positive integer less than or equal to $C_s$, herein $K_d$ is a preset value, or determined according to the number $C_s$ of code blocks and/or the code rate $R_s$ of the physical layer source data packet.

In an alternative implementation mode of the embodiment of the present disclosure, $K_d$ is in direct proportion to code block data $C_s$, with increase of the code block data $C_s$, $K_d$ increases, and vice versa.

In Step S106: Codeword bits are selected from all the source data sub-packets and all the check data sub-packets, the selected codeword bits are cascaded together to form a sequence, and the sequence is sent finally. For example, they can be sent to a subsequent processing module (e.g., modulation).

Specifically, $K_i$ codeword bits are selected from the $i^{th}$ sub-packet in the $C_s$ source data sub-packets, $K_j$ codeword bits are selected from the $j^{th}$ sub-packet in the $C_p$ data sub-packets, all the selected bits are cascaded together to form a sequence having a length of $$G = \sum_{i=0}^{C_s-1} K_i + \sum_{i=0}^{C_p-1} K_j,$$

and then the sequence is sent, herein i=0, 1, . . . , $C_s$−1, j=0, 1, . . . , $C_p$−1, $K_s$, $C_s$ and $K_c$ are integers greater than 1, and $C_p$, $K_i$ and $K_j$ are integers greater than or equal to 0.

In a specific implementation process, in Step S106, during sending of the sequence, the size of $K_i$ and the size of $K_j$ may be determined according to one or more of the following parameters: a codeword length $K_c$ of error-correcting coding, a number of times of transmission of an HARQ process, an RV of an HARQ process, and a length G of a total codeword bit of source data after the whole coding transmission is completed, i=0, 1, . . . , $C_s$−1, j=0, 1, . . . , $C_p$−1. Bit data from the source data sub-packets in the sequence may be sent according to a mode of M1 modulation order, and bit data from the check data sub-packets in the sequence may be sent according to a mode of M2 modulation order, herein M2 is greater than or equal to M1, and M1 and M2 are integers greater than or equal to 2.

The above-mentioned method provided by the embodiment of the present disclosure is described below by means of specific embodiments.

Embodiment 1

The present embodiment is illustrated with an IEEE802.11aj system.

In the IEEE802.11aj system, a code rate supported by the system includes ½, ⅝, ¾ and 13/16, supported all code lengths are Nldpc=672, in a multi-user occasion, a physical layer source data packet namely a Physical Service Data Unit PSDU may be segmented into 1 to 200 code blocks, and in a single-user occasion, a PSDU may be segmented into 1 to 1900 code blocks.

In accordance with the above-mentioned method provided by the embodiment of the present disclosure a physical layer PDU with a length of x bits may be sent according to the following contents.

1) Filling

The PDU is filled with mod(x, Ka) bits, such that the length of the filled PDU is Ks=ceil(x/Ka)*Ka bits. Here, Ka=Kb−Kcbcrc=336−8=328 bits, filling bits being put at the headmost position or rearmost position, herein Cs=ceil(x/Ka).

2) Segmentation

The filled PDU having the length of Ks bits may be code-block segmented into Cs code blocks, each code block having Ka bits. Here, Ka is the above-mentioned Kx.

Code block CRCs are added. The same CRC coding is performed on each code block to generate CRC bits Kcbcrc=8 bits, and after they are put to the corresponding code blocks, each code block has Ka=336 bits.

The code blocks are error-corrected and coded. LDPC coding having a code rate of r0=½ is performed on each code block, each code block obtains coding bits Kc=672 bits, and the first Cs code blocks (source data sub-packets) are obtained.

3) Packet Coding

Packet coding is performed on all coded packets in accordance with the following modes to generate Cp check sub-packets (code block), which are put behind the first Cs code blocks, herein each coding is regarded as a data packet, Cp being greater than or equal to 0.

Packet coding is described below by means of specific examples.

Example a

If Cs=1, packet coding is not performed, Cp=0.

If Cs=2~10, single bit parity check code packet coding is performed on all the packets to generate Cp=1 check sub-packets, the size of each check sub-packet being Kc.

If Cs>10, D-fold single bit parity check code packet coding is performed on all the packets to generate Cp=D check sub-packets, the size of each check sub-packet being Kc, herein the size of D is directly proportional to the number C of code blocks.

Example b

If Cs=1 and Rs>0.85, packet coding is not performed, Kp=0.

If Cs=2~10 and 0.85>=Rs>0.60, single bit parity check code packet coding is performed on all the packets to generate Kp=1 check sub-packets, the size of check sub-packet being Kc.

If Cs>10 and Rs<=0.6, D-fold single bit parity check code packet coding is performed on all the packets to generate Kp=D check sub-packets, the size of check sub-packet being Kc, herein the size of D is directly proportional to the number C of code blocks.

Example c

If Cs=1 or Rs>0.85, packet coding is not performed.

If Cs=2~4 or 0.85>=Rs>0.60, partial single bit parity check code packet coding is performed on all the packets to generate Kp=1 check sub-packets, the size of each check sub-packet being Kd, herein the size of Kd is directly proportional to the number C of code blocks or inversely proportional to Rs.

If Cs=5~10 or 0.85>=Rs>0.60, single bit parity check code packet coding is performed on all the packets.

If Cs>10 or Rs<=0.6, D-fold single bit parity check code packet coding is performed on all the packets to generate Kp=D check sub-packets, the size of each check sub-packet being Kc, herein the size of D is directly proportional to the number C of code blocks or inversely proportional to Rs.

Here, Rs is a code rate after the whole physical layer PDU completes the whole coding transmission, Cs is number of coded blocks before packet coding, and Cp is number of check sub-packets (coded block) generated after packet coding.

(4) Sending

Firstly, Ki codeword bits are selected from the $i^{th}$ sub-packet in the Cs source data sub-packets in sequence, then Kj codeword bits are selected from the $j^{th}$ sub-packet in the Cp data sub-packets, all the selected bits are cascaded together in a sequence of selection to form a sequence having a length of $$G = \sum_{i=0}^{C_s-1} K_i + \sum_{i=0}^{C_p-1} K_j,$$

and the sequence is sent to the subsequent processing module (e.g., modulation module), herein i=0, 1, . . . , Cs+Cp−1.

Sending is described below by means of specific embodiments.

Example d

Suppose the lengths of all check sub-packets are Kc, Cp=1, G=Cs·Kc=Cs·672, Ki and Kj may be determined according to the code length Kc of error-correcting coding, and it is ensured that Rs is still ½. For example, $$K_i = ceil\left(\frac{Cs \cdot Kc}{Cs + Cp}\right) = 611 \; i = 0, \ldots ,$$

$$(Cs \cdot Kc) \bmod (Cs + Cp) - 1 = 0, \ldots, 9$$

$$K_i = floor\left(\frac{Cs \cdot Kc}{Cs + Cp}\right) \; i = other = Null$$

$$K_j = floor\left(\frac{Cs \cdot Kc}{Cs + Cp}\right) = 610 \; j = 0$$

Example e: as for an HARQ Process, Ki and Kj are Obtained According to a Repeat Count For example, as for an HARQ process of a 3GPP LTE system, codewords are alternatively selected from source data sub-packets for the first transmission, if the number of codeword bits of all source data sub-packets are not sufficient, codeword bits are selected from check sub-packets; and codewords are alternatively selected from check sub-packets for the second retransmission, if the number of codeword bits of all source sub-packets are not sufficient, codeword bits are selected from the source data sub-packets.

Example f: as for an HARQ Process, Ki and Kj are Obtained According to an RV

For example, as for an HARQ process of a 3GPP LTE system, codewords are alternatively selected from source data sub-packets when an RV is 0, if the number of codeword bits of all source data sub-packets are not sufficient, codeword bits are selected from check sub-packets; and codewords are alternatively selected from check sub-packets when an RV is 2, if the number of codeword bits of all check sub-packets are not sufficient, codeword bits are selected from the source data sub-packets.

The present embodiment is illustrated with an occasion that the physical layer source data packet is the PSDU. As for other systems where the physical layer source data packet is a TB, BURST or the like, operations are similar to the present embodiment, which will not be specifically elaborated.

In an ultra-high-speed communication system such as a millimeter wave, microwave and wired communication system, physical layer source data is often very big, and needs to be segmented into many code blocks. According to the data sending method in the embodiment of the present disclosure, big physical layer source data is segmented into a plurality of coded blocks, each coded block is error-corrected and coded, different methods for coding inter-code block erasure codes are selected according to different preset conditions, packet coding is performed on different code blocks, and a small number of redundant (check) packets are generated. A contact between the code blocks is established by using the small number of extra packets, and the diversity effect between the code blocks is improved, thereby improving the performance of the whole TB, greatly improving the whole decoding success rate of physical layer source data blocks and the reliability of data transmission, improving the whole BLER performance of physical layer big data blocks (TB, burst, and physical SDU), and reducing the requirement on the BCER.

Figure 3:
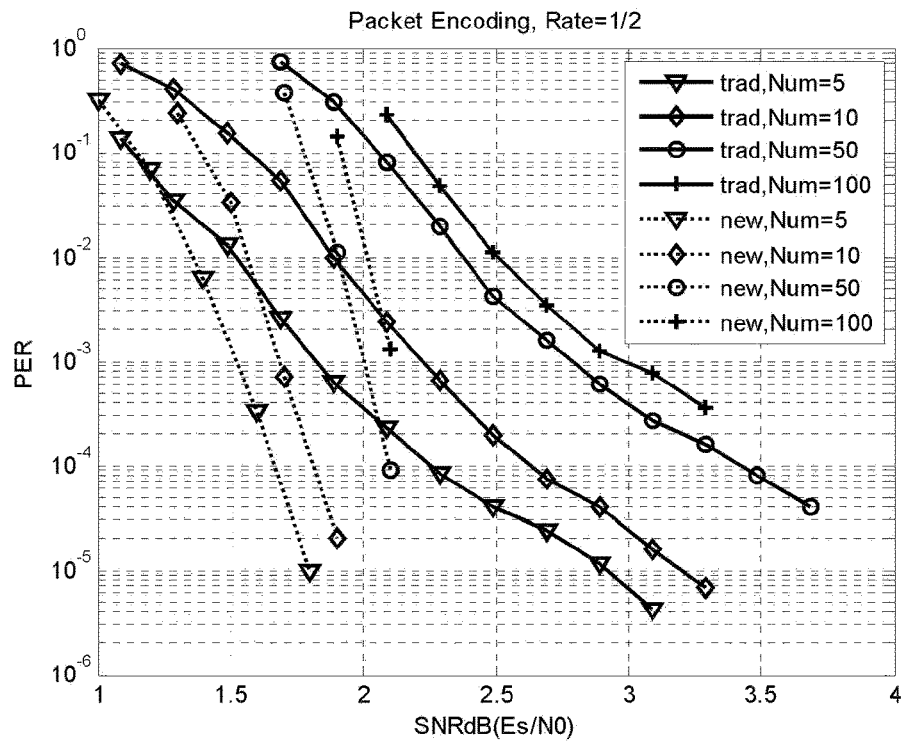
FIG. 3 is a first performance simulation diagram of a traditional no-packet coding solution and a packet coding solution in an embodiment of the present disclosure.
Figure 4:
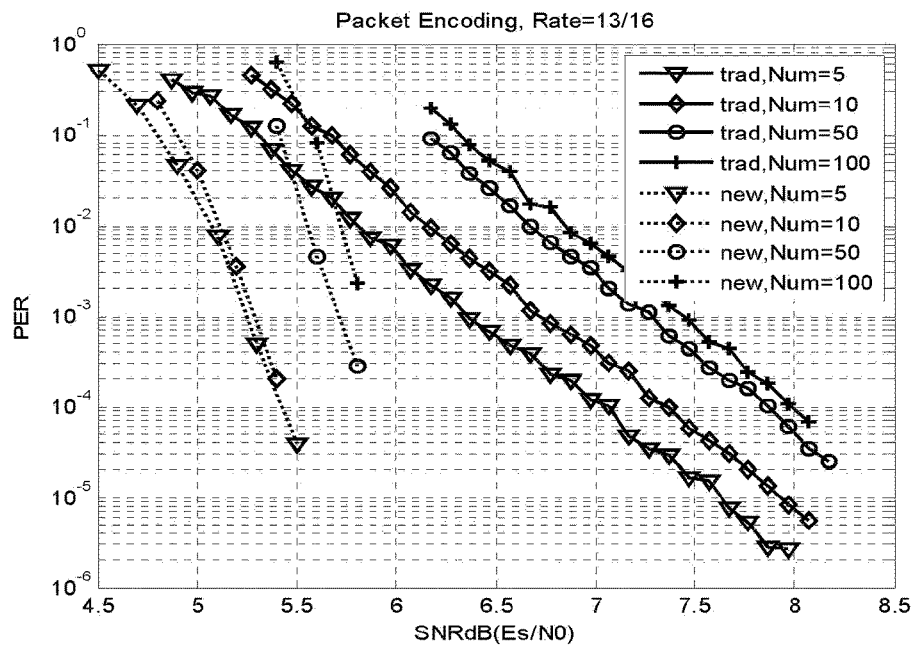
FIG. 4 is a second performance simulation diagram of a traditional no-packet coding solution and a packet coding solution in an embodiment of the present disclosure.

FIG. 3 and FIG. 4 show performance comparisons between a traditional no-packet coding solution and a packet coding solution. Simulation results show that under the condition of keeping an equal spectrum efficiency, the technical solution of the present disclosure achieves a great performance gain, and shows a great technical progress.

Herein, in order to obtain the simulation results shown in FIG. 3 and FIG. 4, simulation may be performed according to the following steps.

1) After CRCs are added to source data packets, the source data packets are segmented into information blocks of each code block (LDPC), the lengths of ½ code rate information blocks being 328 bits, and the lengths of 13/16 code rate information blocks being 538 bits.

2) CRCs of 8 bits are added to the information blocks of each code block (LDPC), the LDPCs are coded to obtain corresponding code blocks ($C_0, C_1, C_2, \ldots, C_{n-1}$), and then these code blocks are subjected to exclusive OR operation bit by bit to obtain a packet-coded code block $C_n$.

3) All bits of all the code blocks (LDPC) are selected, and all pieces of the selected code block data are cascaded to form a sequence, and the sequence is sent.

As for FIG. 3, simulation conditions and performance gains include the following content.

Packet Coding: an actual data packet code block number is: 10, 50, 100; in the presence of one exclusive OR packet, sent data packets are: 11, 51, 101; Traditional Data Packet: an actual data packet code block number is: 10, 50, 100; an extra packet (672 bits) is averagely compensated into all data packets, that is, simulation is performed under the same total data length and total code rate.

Performance Gain (PER=0.01): 0.3 dB for 10, 0.5 dB for 50, and 0.5 dB for 100.

As for FIG. 4, simulation conditions and performance gains include the following content.

Packet Coding: an actual data packet code block number is: 10, 50, 100; in the presence of one exclusive OR packet, sent data packets are: 11, 51, 101; Traditional Data Packet: an actual data packet code block number is: 10, 50, 100; an extra packet (672 bits) is averagely compensated into all data packets, that is, simulation is performed under the same total data length and total code rate.

Performance Gain (PER=0.01): 2 dB for 10, 2.1 dB for 50, and 2.1 dB for 100.

According to the embodiment of the present disclosure, a data sending apparatus is also provided. The apparatus is arranged to implement the above-mentioned data sending method.

Figure 5:
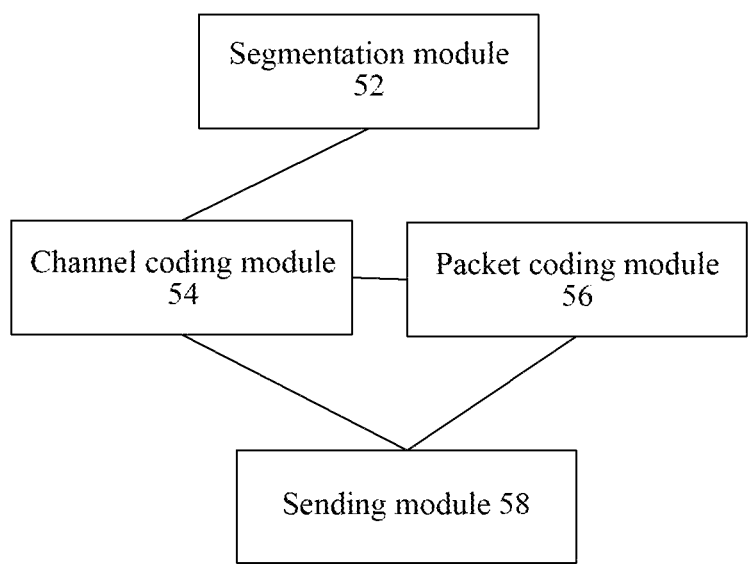
FIG. 5 is a structural diagram of a data sending apparatus according to an embodiment of the present disclosure.

FIG. 5 is a structural diagram of a data sending apparatus according to an embodiment of the present disclosure. As shown in FIG. 5, the apparatus mainly includes: a segmentation module 52, arranged to perform code block segmentation on a physical layer source data packet, to be sent, having a length of $K_s$ bits; a channel coding module 54, arranged to perform channel coding on each code block obtained by segmentation, to obtain $C_s$ error-corrected and coded source data sub-packets having lengths of $K_c$ bits, herein $K_s$, $C_s$ and $K_c$ are integers greater than 1; a packet coding module 56, arranged to perform packet coding on the error-corrected and coded source data sub-packets, to obtain $C_p$ check data sub-packets; and a sending module 58, arranged to select $K_i$ codeword bits from the $i^{th}$ sub-packet in the $C_s$ source data sub-packets, select $K_j$ codeword bits from the $j^{th}$ sub-packet in the $C_p$ check data sub-packets, cascade all the selected bits together to form a sequence having a length of $$G = \sum_{i=0}^{C_s-1} K_i + \sum_{i=0}^{C_p-1} K_j$$

($i=0, 1, \ldots, C_s-1, j=0, 1, \ldots, C_p-1$), and send the sequence, herein $C_p$, $K_i$ and $K_j$ are integers greater than or equal to 0.

In an exemplary embodiment, the segmentation module 52 is further arranged to perform code block segmentation on $K_s$ bit physical layer source data to obtain $C_s$ code blocks, and then add a code block CRC having an equal length of $X_{crc}$ bits to each code block, herein $X_{crc}$ is a CRC bit number of each source data sub-packet.

In an exemplary embodiment, the packet coding module 56 may include: a first packet coding sub-unit, arranged to perform, under the condition that the number $C_s$ of code blocks is greater than a preset threshold $C_0$ and/or a code rate $R_s$ of the physical layer source data packet is less than a preset code rate $R_0$, packet coding on the $C_s$ source data sub-packets, to obtain $C_p K_c$ bit check data sub-packets, herein $C_0$, $R_0$ and $C_p$ are positive integers; and a second packet coding unit, arranged to not perform, under the condition that the number $C_s$ of code blocks is less than or equal to the preset threshold $C_0$ and/or the code rate $R_s$ of the physical layer source data packet is greater than or equal to the preset code rate $R_0$, packet coding on the $C_s$ source data sub-packets, or arranged to perform packet coding only on first $K_d$ bits of the $C_s$ source data sub-packets, herein $K_d$ is a positive integer less than or equal to $K_e$, and $K_d$ is a preset value or determined according to the number $C_s$ and/or $R_s$ of code blocks, herein the code rate $R_s$ of the physical layer source data packet refers to a length $K_s$ of the physical layer source data packet or a ratio of a length $K_s - X_{scrc}$ of source data packet not including source data CRC to a length G of a total codeword bit of source data after the whole coding transmission is completed, and $X_{scrc}$ is a length of a source data packet CRC.

In an exemplary embodiment, the first packet coding unit may perform packet coding on the $K_c$ source data sub-packets by means of the following modes: forming an $i^{th}$ information sequence $S_i$ having a length of $C_s$ bits by $i^{th}$ bits of all the source data sub-packets in sequence, and performing check coding on the information sequence $S_i$, to obtain an $i^{th}$ check sequence $P_i$ with D bits, a $j^{th}$ bit of the check sequence $P_i$ forming an $i^{th}$ bit of the $j^{th}$ check data sub-packet, herein $i=0, 1, 2, \ldots, K_c-1, j=0, \ldots, C_p-1$, and D is an integer greater than or equal to 1.

In an exemplary embodiment, the first packet coding unit may perform check coding on the information sequence $S_i$ by using one of the following coding modes: SPC coding, D-fold single bit parity check code, and D-fold single bit parity check code having different coefficients of a multi-element field GF(q).

In an exemplary embodiment, the first packet coding unit performs D-fold single bit parity check code on the information sequence $S_i$ according to the following modes: performing binary exclusive OR addition on all input $C_s$ information bits, to obtain a first check bit, and performing binary exclusive OR addition on a subset $Set_l$ of the $C_s$ information bits, to obtain an $(l+2)^{th}$ check bit, herein every two subsets, in various subsets of the $C_s$ information bits, do not have identical elements, and the number of elements in any one subset is less than or equal to ceil(D/2); or, performing binary exclusive OR addition on all input $C_s$ information bits, to obtain a first check bit, performing $l^{th}$ interweaving on the $C_s$ information bits, and performing binary exclusive OR addition on first floor($C_s/2$) or ceil($C_s/2$) bits, to obtain an $(l+2)^{th}$ check bit, herein every two interweaving modes of interweaving at each time are totally different, herein $l=0, \ldots, D-2$.

In an exemplary embodiment, the sending module sends the sequence according to the following modes: determining the size of $K_i$ and the size of $K_j$ according to one or more of the following parameters: a codeword length $K_c$ of error-correcting coding, a number of times of transmission of an HARQ process, an RV of an HARQ process, and a length G of a total codeword bit of source data after the whole coding transmission is completed, $i=0, 1, \ldots, C_s-1, j=0, 1, \ldots, C_p-1$; and/or, sending bit data from the source data sub-packets in the sequence according to a mode of M1 modulation order, and sending bit data from the check data sub-packets in the sequence according to a mode of M2 modulation order, herein M2 is greater than or equal to M1, and M1 and M2 are integers greater than or equal to 2.

According to the embodiment of the present disclosure, a data sending end is also provided, which includes the above-mentioned data sending apparatus.

By means of the technical solution provided by the embodiment of the present disclosure, at a receiving side, a receiving end performs independent error-correcting and decoding on each data packet (coded block), when the PER of a source data packet is below 0.5, there is one or two error packets in most error conditions, and three or more error packets occur in least conditions. Then, $i^{th}$ wrong log-likelihood ratio information LLR(i)' may be provided by using other error packets for an $i^{th}$ error packet according to a packet coding relationship, own LLR(i) of the $i^{th}$ error packet and LLR(i)' are directly added, and then the $i^{th}$ error packet is decoded for one time, i being an index of an error packet. Code block decoding is performed serially under normal conditions, and data of error code blocks is below 10% generally, so the increase count of code block decoding is also below 10%, and therefore the packet coding gain of the present disclosure may be implemented by increasing the decoding complexity of 10% below. Besides, it is necessary to point out that fold increase of the decoding complexity is unacceptable for a future communication system, particularly an ultra-high-speed communication system.

From the above descriptions, it may be seen that in the embodiment of the present disclosure, different methods for coding inter-code block erasure codes are selected according to different preset conditions, packet coding is performed on different code blocks, and a small number of redundant (check) packets are generated. A contact between the code blocks is established by using the redundant packets, and the diversity effect between the code blocks is improved, thereby improving the performance of the whole TB, and greatly improving the whole decoding success rate of physical layer source data blocks and the reliability of data transmission. The BLER performance of physical layer big data blocks (which may be segmented into a great number of code blocks) may be improved under the same spectrum efficiency, and the requirement on the BCER is reduced. Simulation may prove that the technical solution provided by the embodiment of the present disclosure may obviously improve the performance of a system, thereby improving the overall performance of the ultra-high-speed communication system.

Apparently, those skilled in the art shall understand that the above-mentioned all modules or all steps of the present disclosure may be implemented using a general calculation apparatus, may be centralized on a single calculation apparatus or may be distributed on a network composed of a plurality of calculation apparatuses. In an exemplary embodiment, they may be implemented using executable program codes of the calculation apparatuses. Thus, they may be stored in a storage apparatus and executed by the calculation apparatuses, the shown or described steps may be executed in a sequence different from this sequence under certain conditions, or they are manufactured into each integrated circuit module respectively, or a plurality of modules or steps therein are manufactured into a single integrated circuit module. Thus, the present disclosure is not limited to a combination of any specific hardware and software.

The above is only the embodiments of the present disclosure, and not used to limit the present disclosure. There may be various modifications and variations in the present disclosure for those skilled in the art. Any modifications, equivalent replacements, improvements and the like made within the spirit and principle of the present disclosure shall fall within the scope of protection of the present disclosure.

INDUSTRIAL APPLICABILITY

As above, the data sending method and apparatus provided by the embodiment of the present disclosure have the following beneficial effects. A physical layer big data block (TB) which may be segmented into a great number of coded blocks is coded, thereby improving the transmission performance of the big data block.

What we claim is:

1. A data sending method suitable for a transmitter sending a source data packet at a physical layer, comprising:
    performing code block segmentation on the source data packet at the physical layer where the source data packet is to be sent and has a length of Ks bits and performing channel coding on various code blocks obtained by segmentation, to obtain $C_s$ error-corrected and coded source data sub-packets having lengths of $K_c$ bits;
    performing packet coding on the error-corrected and coded source data sub-packets, to obtain $C_p$ check data sub-packets; and
    selecting $K_i$ codeword bits from a $i^{th}$ sub-packet in the $C_s$ source data sub-packets,
    selecting $K_j$ codeword bits from a $j^{th}$ sub-packet in the $C_p$ check data sub-packets, cascading all the selected bits together to form a sequence having a length of $$G = \sum_{i=0}^{C_s-1} K_i + \sum_{i=0}^{C_p-1} K_j,$$

i=0, 1, . . . , $C_s$–1, j=0, 1, . . . , $C_p$–1, and sending the sequence, wherein $K_s$, $C_s$ and $K_c$ are integers greater than 1, and $C_p$, $K_i$ and $K_j$ are integers greater than or equal to 0.

2. The method according to claim 1, wherein performing packet coding on the error-corrected and coded source data sub-packets to obtain the check data sub-packets comprises:
    under a condition that the number $C_s$ of code blocks is greater than a preset threshold $C_0$ and/or a code rate $R_s$ of the source data packet at the physical layer is less than a preset code rate $R_0$, performing packet coding on the $C_s$ source data sub-packets, to obtain $C_p$ check data sub-packets with $K_c$ bits, wherein $C_0$ and $R_0$ are positive integers; and
    under a condition that the number $C_s$ of code blocks is less than or equal to the preset threshold $C_0$ and/or the code rate $R_s$ of the physical source data packet is greater than or equal to the preset code rate $R_0$, not performing packet coding on the $C_s$ source data sub-packets or performing packet coding only on first $K_d$ bits of the $C_s$ source data sub-packets, wherein $K_d$ is a positive integer less than or equal to $K_c$,
    wherein the code rate $R_s$ of the source data packet at the physical layer refers to a length $K_s$ of the source data packet at the physical layer or a ratio of $K_s$–$X_{scrc}$ to a length G of total codeword bits of, after a whole coding transmission is completed, source data, and $X_{scrc}$ is a length of a Cyclic Redundancy Check, CRC, code of the source data packet at the physical layer.

3. The method according to claim 2, wherein $K_d$ is a preset value, or determined according to the number $C_s$ of code blocks and/or the code rate $R_s$ of the source data packet at the physical layer.

4. The method according to claim 2, wherein performing packet coding on the $C_s$ source data sub-packets to obtain the $C_p$ check data sub-packets with $K_c$ bits comprises:

forming an $i^{th}$ information sequence $S_i$ having a length of $C_s$ bits by $i^{th}$ bits of all the source data sub-packets in sequence, and performing check coding on the information sequence $S_i$, to obtain an $i^{th}$ check sequence $P_i$ with D bits, a $j^{th}$ bit of the check sequence $P_i$ forming an $i^{th}$ bit of the $j^{th}$ check data sub-packet, wherein i=0, 1, 2, ..., $K_c-1$, j=0, $C_p-1$, and D is an integer greater than or equal to 1.

5. The method according to claim 4, wherein the check coding comprises one of: Single Parity Check, SPC, coding, D-fold single bit parity check code, and D-fold single bit parity check code having different coefficients of a multi-element field GF(q).

6. The method according to claim 5, wherein performing D-fold single bit parity check code on the information sequence $S_i$ comprises:

performing a binary exclusive OR addition on all input $C_s$ information bits, to obtain a first check bit; and performing the binary exclusive OR addition on a subset $Set_l$ of the $C_s$ information bits, to obtain a $(1+2)^{th}$ check bit, wherein every two subsets, in various subsets of the $C_s$ information bits, do not have identical elements, and the number of elements in any one subset is less than or equal to ceil(D/2), wherein l=0, ..., D-2.

7. The method according to claim 5, wherein performing D-fold single bit parity check code on the information sequence $S_i$ comprises:

performing a binary exclusive OR addition on all input $C_s$ information bits, to obtain a first check bit; and performing $l^{th}$ interweaving on the $C_s$ information bits, and performing the binary exclusive OR addition on first floor($C_s/2$) or ceil($C_s/2$) bits, to obtain a $(1+2)^{th}$ check bit, wherein every two interweaving modes of interweaving for each time are totally different, l=0, ..., D-2.

8. The method according to claim 2, wherein $C_0$ is an integer greater than 2, and $R_0$ is a real number ranging from 0 to 1.

9. The method according to claim 1, wherein sending the sequence comprises:

determining the size of $K_i$ and the size of $K_j$ according to one or more of the following parameters: a codeword length $K_c$ of error-correcting coding, a number of times of transmission of a Hybrid Automatic Repeat Request, HARQ, process, a Redundancy Version, RV, of an HARQ process, and a length G of total codeword bits of, after the whole coding transmission is completed, source data, i=0, 1, ..., $C_s-1$, j=0, 1, ..., $C_p-1$; and/or, sending bit data from the source data sub-packets in the sequence according to a mode of M1 modulation order, and sending bit data from the check data sub-packets in the sequence according to a mode of M2 modulation order, wherein M2 is greater than or equal to M1, and M1 and M2 are integers greater than or equal to 2.

10. The method according to claim 1, wherein before performing code block segmentation, the source data packet at the physical layer comprises a CRC having a length of $X_{scrc}$ bits.

11. The method according to claim 1, wherein during code block segmentation, code block segmentation is performed on physical layer source data with $K_s$ bits to obtain $C_s$ source data sub-packets, and a code block CRC having an equal length of $X_{crc}$ bits is added to each source data sub-packet, wherein $X_{crc}$ is a CRC bit number of each source data sub-packet.

12. The method according to claim 11, wherein if $K_s < C_s^*(K_x - X_{crc})$, before code block segmentation is performed on the source data packet at the physical layer where the source data packet is to be sent and has a length of Ks bits, source data packet source data packet at the physical layer is filled with $C_s^*(K_x - X_{crc}) - K_s$ predetermined filling bits, wherein $K_x$ is a length of each code block after a code block CRC is added.

13. The method according to claim 1, wherein performing channel coding on various code blocks obtained by segmentation comprises: channel coding with the same code rate and the same coding mode is performed on each code block to obtain codeword data sub-packets having the same length of $K_c$ bits, wherein the channel coding mode comprises one of: Reed Muller, convolutional code, turbo code, and Low Density Parity Check, LDPC.

14. A transmitter for sending a source data packet at a physical layer, comprising:

a segmentation module, arranged to perform code block segmentation on the source data packet at the physical layer where the source data packet is to be sent and has a length of Ks bits;

a channel coding module, arranged to perform channel coding on various code blocks obtained by segmentation, to obtain $C_s$ error-corrected and coded source data sub-packets having lengths of $K_c$ bits, wherein $K_s$, $C_s$ and $K_c$ are integers greater than 1;

a packet coding module, arranged to perform packet coding on the error-corrected and coded source data sub-packets, to obtain $C_p$ check data sub-packets; and a sending module, arranged to select $K_i$ codeword bits from an $i^{th}$ sub-packet in the $C_s$ source data sub-packets, select $K_j$ codeword bits from a $j^{th}$ sub-packet in the $C_p$ check data sub-packets, cascade all the selected bits together to form a sequence having a length of $$G = \sum_{i=0}^{C_s-1} K_i + \sum_{i=0}^{C_p-1} K_j \quad i = 0,$$

1, ..., $C_s-1$, j=0, 1, ..., $C_p-1$, and send the sequence, wherein $C_p$, and $K_j$ are integers greater than or equal to 0.

15. The transmitter according to claim 14, wherein the packet coding module comprises:

a first packet coding sub-unit, arranged to perform, under a condition that the number $C_s$ of code blocks is greater than a preset threshold $C_0$ and/or a code rate $R_s$ of the source data packet at the physical layer is less than a preset code rate $R_0$, packet coding on the $K_c$ source data sub-packets, to obtain $C_p$ check data sub-packets with $K_c$ bits, wherein $C_0$ and $R_0$ are positive integers; and a second packet coding unit, arranged to not perform, under a condition that the number $C_s$ of code blocks is less than or equal to the preset threshold $C_0$ and/or the code rate $R_s$ of the source data packet at the physical layer is greater than or equal to the preset code rate $R_0$, packet coding on the $C_s$ source data sub-packets, or arranged to perform packet coding only on first $K_d$ bits of the $C_s$ source data sub-packets, wherein $K_d$ is a positive integer less than or equal to $K_c$, and $K_d$ is a preset value or determined according to the number $C_s$ of code blocks and/or $R_s$.

wherein the code rate $R_s$ of the source data packet at the physical layer refers to a length $K_s$ of the source data packet at the physical layer or a ratio of $K_s-X_{scrc}$ to a length G of total codeword bits of, after a whole coding transmission is completed, source data, and $X_{scrc}$ is a length of a Cyclic Redundancy Check, CRC, code of the source data packet at the physical layer.

16. The transmitter according to claim 15, wherein the first packet coding unit performs packet coding on the $C_s$ source data sub-packets by means of the following modes:
    forming an $i^{th}$ information sequence $S_i$ having a length of $C_s$ bits by $i^{th}$ bits of all the source data sub-packets in sequence, and performing check coding on the information sequence $S_i$, to obtain an $i^{th}$ check sequence $P_i$ with D bits, a $j^{th}$ bit of the check sequence $P_i$ forming an $i^{th}$ bit of $j^{th}$ check data sub-packet, wherein i=0, 1, 2, ..., $K_c-1$, j=0, $C_p-1$, and D is an integer greater than or equal to 1.

17. The transmitter according to claim 16, wherein the first packet coding unit performs check coding on the information sequence $S_i$ by using one of the following coding modes: Single Parity Check, SPC, coding, D-fold single bit parity check code, and D-fold single bit parity check code having different coefficients of a multi-element field GF(q).

18. The transmitter according to claim 17, wherein the first packet coding unit performs check coding on the information sequence $S_i$ by using the D-fold single bit parity check code according to following modes:
    performing a binary exclusive OR addition on all input $C_s$ information bits, to obtain a first check bit, and performing the binary exclusive OR addition on a subset $Set_1$ of the $C_s$ information bits, to obtain a $(l+2)^{th}$ check bit, wherein every two subsets, in various subsets of the $C_s$ information bits, do not have identical elements, and the number of elements in any one subset is less than or equal to ceil(D/2); or,
    performing the binary exclusive OR addition on all input $C_s$ information bits, to obtain a first check bit, performing $l^{th}$ interweaving on the $C_s$ information bits, and performing the binary exclusive OR addition on first floor($C_s/2$) or ceil($C_s/2$) bits, to obtain a $(l+2)^{th}$ check bit, wherein every two interweaving modes of interweaving for each time are totally different, wherein l=0, ..., D-2.

19. The transmitter according to claim 14, wherein the sending module sends the sequence according to the following modes:
    determining the size of $K_i$ and the size of $K_j$ according to one or more of the following parameters: a codeword length $K_c$ of error-correcting coding, a number of times of transmission of a Hybrid Automatic Repeat Request, HARQ, process, a Redundancy Version, RV, of an HARQ process, and a length G of total codeword bits of source data after the whole coding transmission is completed, i=0, 1, ..., $C_s-1$, j=0, 1, ..., $C_p-1$; and/or,
    sending bit data from the source data sub-packets in the sequence according to a mode of M1 modulation order, and sending bit data from the check data sub-packets in the sequence according to a mode of M2 modulation order, wherein M2 is greater than or equal to M1, and M1 and M2 are integers greater than or equal to 2.

20. The transmitter according to claim 14, wherein the segmentation module is further arranged to perform code block segmentation on physical layer source data with $K_s$ bits to obtain $C_s$ source data sub-packets, and then add a code block CRC having an equal length of $X_{crc}$ bits to each source data sub-packet, wherein $X_{crc}$ is a CRC bit number of each source data sub-packet.

\* \* \* \* \*